J. JOHNSON.
Plow.
No. 4,552.  Patented May 30, 1846.
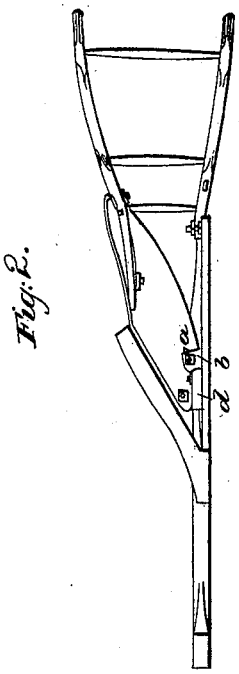
Fig. 2.
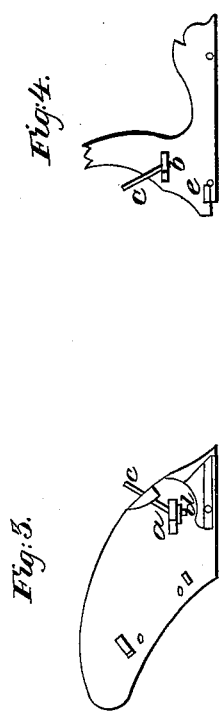
Fig. 4.
Fig. 3.
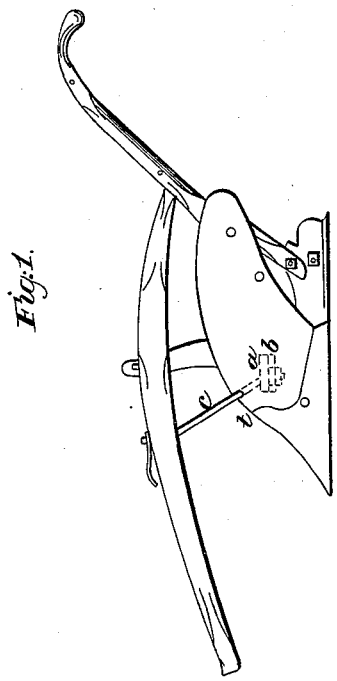
Fig. 1.

UNITED STATES PATENT OFFICE.

JAMES JOHNSON, OF WOOSTER, OHIO.

IMPROVEMENT IN PLOWS.

Specification forming part of Letters Patent No. 4,552, dated May 30, 1846.

*To all whom it may concern:*

Be it known that I, JAMES JOHNSON, of Wooster, in the county of Wayne and State of Ohio, have invented a new and useful Improvement in Plows; and I do hereby declare that the following is a full, clear, and exact description of the principle or character which distinguishes my invention from all other things before known, and of the manner of making, constructing, and using the same, reference being had to the accompanying drawings, making part of this specification, in which—

Figure 1 is a side elevation; Fig. 2, a view of the underside of the plow; Fig. 3, the inside of the mold-board; Fig. 4, part of the inside of the landside.

The same letters indicate like parts in all the figures.

My invention consists in the manner of combining the mold-board and landside of the plow and bracing them and connecting them together.

The mold-board and landside are in their outer form similar to those now in common use of the most approved shape. On the inside of the mold-board at about half its height, near the front edge, there is an inward projection, $a$. (This is shown in Fig. 2 and by dotted lines in Fig. 1.) Just below it is a projection, $b$, from the landside that overlaps it. Through both a bolt passes which extends up in a line curved forward through the mold-board, which projects in front of the standard above the cutter of the share, and in a line therewith at the point $t$, so as to prevent the dirt from lodging between them, and thence through the beam forming the brace $c$. On the inside of the lower front corner of the mold-board there is a projection, $d$, which extends back on a line with the inside of the landside. On the face of this projection $d$, next the landside, there is a groove, as shown in Fig. 3, into which a projection, $e$, Fig. 4, fits, by which both parts are held steady, fastened by a bolt passing through both. The other parts of the plow are made and fastened in the usual way.

By my improvements the plow can be made light and equally strong.

Having thus fully described my improvements, what I claim therein as new, and desire to secure by Letters Patent, is—

The mode herein described of connecting the mold-board and landside of a plow, and bracing them by means of the projections $a$ and $b$, the bracing-rod $c$, and the connections $d$ and $e$ below, in the manner and for the purpose specified.

JAMES JOHNSON.

Witnesses:
   I. W. SCHUCKUS,
   WM. WARNE.